United States Patent
McEwen

(10) Patent No.: US 10,640,219 B2
(45) Date of Patent: May 5, 2020

(54) ENERGETIC EVACUATION SLIDE

(71) Applicant: GOODRICH CORPORATION, Charlotte, NC (US)

(72) Inventor: Jim McEwen, Tempe, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 318 days.

(21) Appl. No.: 15/687,241

(22) Filed: Aug. 25, 2017

(65) Prior Publication Data

US 2019/0061960 A1 Feb. 28, 2019

(51) Int. Cl.
| | | |
|---|---|---|
| *B64D 25/14* | (2006.01) | |
| *C06C 9/00* | (2006.01) | |
| *G06F 9/30* | (2018.01) | |
| *G06F 11/30* | (2006.01) | |

(52) U.S. Cl.
CPC ............. *B64D 25/14* (2013.01); *C06C 9/00* (2013.01); *G06F 9/3004* (2013.01); *G06F 11/3044* (2013.01)

(58) Field of Classification Search
CPC .......... B64D 25/14; B64D 25/18; B63C 9/18; B63C 2009/0029; B63C 2009/0047
See application file for complete search history.

(56) References Cited

U.S. PATENT DOCUMENTS

| | | | | |
|---|---|---|---|---|
| 4,434,870 A | * | 3/1984 | Fisher | A62B 1/20 182/48 |
| 4,460,062 A | | 7/1984 | Fisher | |
| 6,676,082 B2 | * | 1/2004 | Alberts | B64D 25/14 244/137.2 |
| 9,139,305 B2 | | 9/2015 | Brown | |
| 2014/0145421 A1 | * | 5/2014 | McFarland | B60R 21/2644 280/741 |
| 2015/0251738 A1 | * | 9/2015 | Mukhortov | B63C 9/155 441/92 |

* cited by examiner

*Primary Examiner* — Nicholas McFall
(74) *Attorney, Agent, or Firm* — Snell & Wilmer, L.L.P.

(57) ABSTRACT

An evacuation system may comprise an evacuation slide comprising an inflatable portion; and a reactant packet disposed within the inflatable portion including a chemically reactive material configured to produce gas and inflate the evacuation slide.

18 Claims, 8 Drawing Sheets

ENERGETIC EVACUATION SLIDE

FIELD

The present disclosure relates to emergency evacuations systems for vehicles such as aircraft, and more particularly, to the inflation of an emergency evacuation slide.

BACKGROUND

In the event of an aircraft evacuation, evacuation systems, which may comprise an evacuation slide, are often deployed to safely usher passengers from the aircraft to the ground. Upon deployment of an evacuation system in an emergency situation, inflation of the evacuation slide should be immediate or near immediate in order to allow evacuation of the aircraft in a short time after an emergency situation begins.

SUMMARY

In various embodiments, an evacuation system may comprise an evacuation slide comprising an inflatable portion; and/or a reactant packet disposed within the inflatable portion including a chemically reactive material configured to react to produce a gas and inflate the evacuation slide. In various embodiments, the inflatable portion may comprise at least two longitudinal tubes spanning between a fuselage end and a surface end of the evacuation slide, and a cross tube, wherein the at least two longitudinal tubes are in fluid communication with the cross tube. In various embodiments, the evacuation system may further comprise a trigger system and/or a cable assembly, wherein the cable assembly is coupled to the trigger system and the reactant packet. In various embodiments, the cable assembly may be coupled to the evacuation slide within a cable tunnel disposed in the inflatable portion of the evacuation slide. In various embodiments, the chemically reactive material comprises a solid material.

In various embodiments, the reactant packet may be a first reactant packet, and the evacuation system may further comprise a second reactant packet disposed within the inflatable portion, wherein the second reactant packet may comprise a second chemically reactive material configured to react and produce a second gas. In various embodiments, the evacuation system may further comprise a timer, wherein the first reactant packet and the second reactant packet may be configured to activate a delay duration apart.

In various embodiments, the evacuation system may further comprise a sensor at least one of coupled to or disposed proximate to the evacuation slide configured to take a parameter measurement of a parameter surrounding the evacuation slide, wherein the evacuation system is configured to initiate activation of at least one of the first reactant packet or the second reactant packet based on the parameter measurement. In various embodiments, the sensor may be a position sensor configured to detect an orientation of the evacuation system, wherein the evacuation system may be configured to activate at least one of the first reactant packet or the second reactant packet based on the orientation. In various embodiments, the sensor may be a pressure sensor configured to measure a pressure of the evacuation slide, wherein the evacuation system may be configured to activate a first of the first reactant packet and the second reactant packet, and subsequently activate a second of the first reactant packet and the second reactant packet based on the pressure. In various embodiments, the sensor may be a temperature sensor configured to measure a temperature at least one of in or proximate to the evacuation slide, wherein the evacuation system may be configured to stagger activation of a first of the first reactant packet and the second reactant packet and a second of the first reactant packet and the second reactant packet based on the temperature.

In various embodiments, the evacuation system may further comprise a processor in electronic communication with a trigger system; and a tangible, non-transitory memory configured to communicate with the processor, the tangible, non-transitory memory having instructions stored thereon that, in response to execution by the processor, cause the processor to perform operations. The operations may comprise detecting, by the processor, a deployment of the evacuation system; and/or commanding, by the processor, the trigger system to activate the first reactant packet and react the chemically reactive material to produce gas to inflate the evacuation slide. In various embodiments, the evacuation system may further comprise a sensor coupled to the evacuation slide, wherein the sensor is in electronic communication with the processor and is configured to measure a parameter of the evacuation slide during inflation, wherein the parameter is at least one of temperature or pressure. The operations may further comprise receiving, by the processor, a parameter measurement from the sensor; and/or commanding, by the processor, the trigger system to activate the second reactant packet in response to the receiving the parameter measurement.

In various embodiments a method of inflating an evacuation slide of an evacuation system may comprise activating a first reactant packet disposed in the evacuation slide; reacting a chemically reactive material in the first reactant packet in response to the activating the first reactant packet, producing a gas; and/or inflating the evacuation slide with the gas. In various embodiments, the activating the first reactant packet may comprise commanding, by a processor, a trigger system to apply a current to the first reactant packet; applying the current to the first reactant packet via the trigger system; and/or igniting an electrical ignitor comprised in the first reactant packet in response to the applying the current to the first reactant packet. In various embodiments, the reacting the chemically reactive material in the first reactant packet may be in response to the igniting the electrical ignitor.

In various embodiments, the method may further comprise receiving, by a processor, a parameter measurement from a sensor in response to the reacting the chemically reactive material, wherein the sensor is coupled to and/or disposed proximate to the evacuation slide. In various embodiments, the method may further comprise activating a second reactant packet disposed in the evacuation slide in response to the receiving the parameter measurement; reacting a second chemically reactive material in the second reactant packet in response to the activating the second reactant packet, producing a second gas; and/or further inflating the evacuation slide with the second gas. In various embodiments, the method may further comprise preventing, by the processor, activation of a second reactant packet disposed in the evacuation slide in response to the receiving the parameter measurement. In various embodiments, the method may further comprise detecting, by the processor, that a delay duration has lapsed after the activating the first reactant packet, and activating a second reactant packet in response to the detecting that the delay duration has lapsed.

In various embodiments, an aircraft may comprise a fuselage; an emergency exit door coupled to the fuselage; and/or an evacuation system at least one of coupled to or proximate the emergency exit door, wherein the evacuation system may be coupled to the fuselage. In various embodiments, the evacuation system may comprise an evacuation slide comprising an inflatable portion; a first reactant packet disposed within the inflatable portion including a chemically reactive material configured to produce gas and inflate the evacuation slide; and/or a second reactant packet disposed within the inflatable portion including a chemically reactive material configured to produce gas and inflate the evacuation slide. In various embodiments, the evacuation system may be configured to stagger activation of the first reactant packet and the second reactant packet based on at least one of a time interval, an orientation of the aircraft, a pressure inside the inflatable portion, or a temperature at least one of in or proximate to the evacuation slide.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

FIG. 1 illustrates a perspective view of an aircraft 5 having an evacuation system compartment 10, in accordance with various embodiments. Aircraft 5 may comprise a fuselage 12 with wings fixed to fuselage 12. An emergency exit door 6 may be disposed on fuselage 12 to allow passengers to exit the aircraft 5. Emergency exit door 6, in various embodiments, may be situated over the wings of the aircraft such that passengers exiting through the emergency exit door 6 can exit onto the wing(s). Emergency exit door 6 may be situated at any suitable location along fuselage 12. In various embodiments, evacuation system compartment 10 may be coupled to emergency exit door 6 and/or fuselage 12, and may be on the inside or outside of aircraft 5. Evacuation system compartment 10 may comprise an evacuation system, which may be deployed in response to opening emergency exit door 6, for example.

Figure 1A:
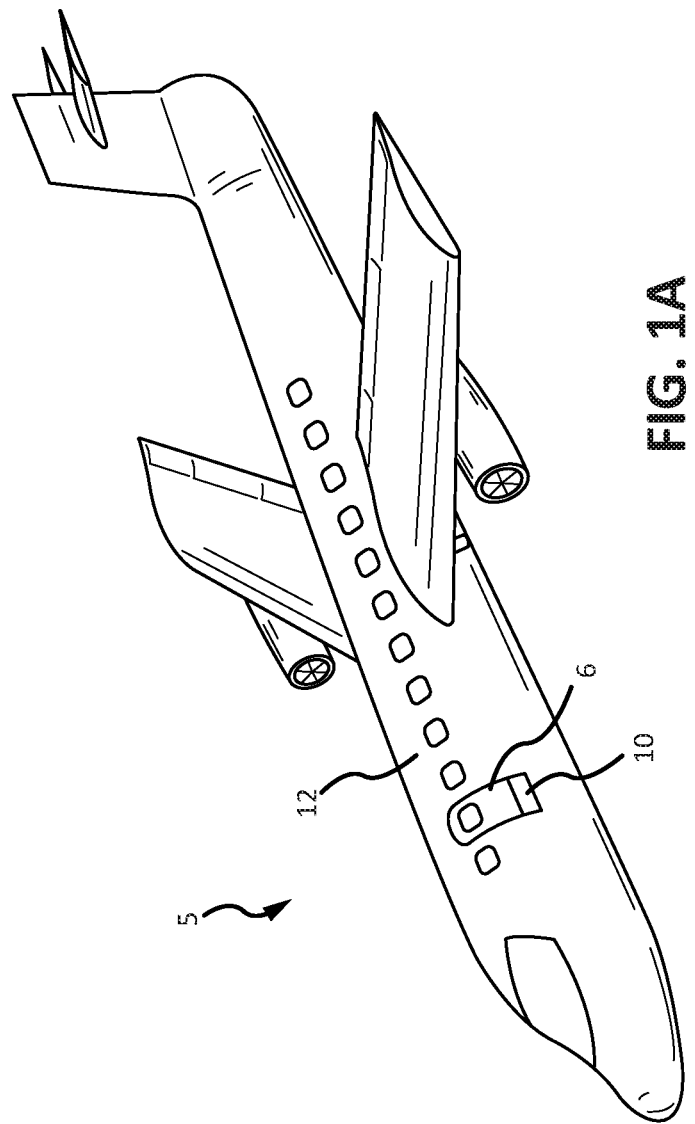
FIG. 1A illustrates a perspective view of an aircraft comprising an evacuation system, in accordance with various embodiments.
Figure 1B:
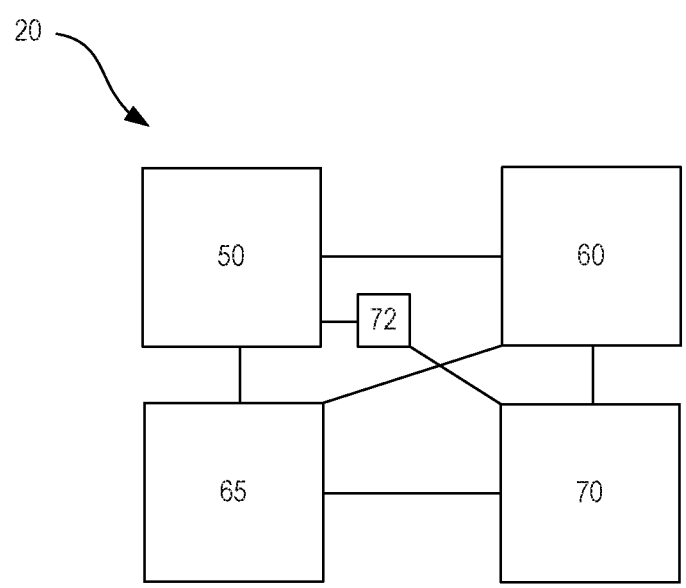
FIG. 1B illustrates a block diagram of an evacuation system, in accordance with various embodiments.

In various embodiments, with reference to FIGS. 1A and 1B, evacuation system compartment 10 may comprise an evacuation system 20. Evacuation system 20 may comprise an evacuation slide 50, a reactant packet 60 (which may comprise various reactant packet stages, i.e., primary, secondary, etc.), a trigger system 65, and/or a processor 70. Reactant packet 60 may be coupled to evacuation slide 50. Trigger system 65 may be electrically coupled to processor 70 and/or reactant packet 60 in any suitable manner such as an electronic cable or a wireless connection. In various embodiments, processor 70 may be comprised in trigger system 65. In various embodiments, evacuation system 20 may comprise a sensor 72. Sensor 72 may be coupled to evacuation slide 50 to measure a parameter of evacuation slide 50 and/or the surrounding environment. Processor 70 may be in electronic communication with sensor 72 and/or evacuation slide 50. Examples of the components of evacuation system 20 will be further explained herein.

Figure 2A:
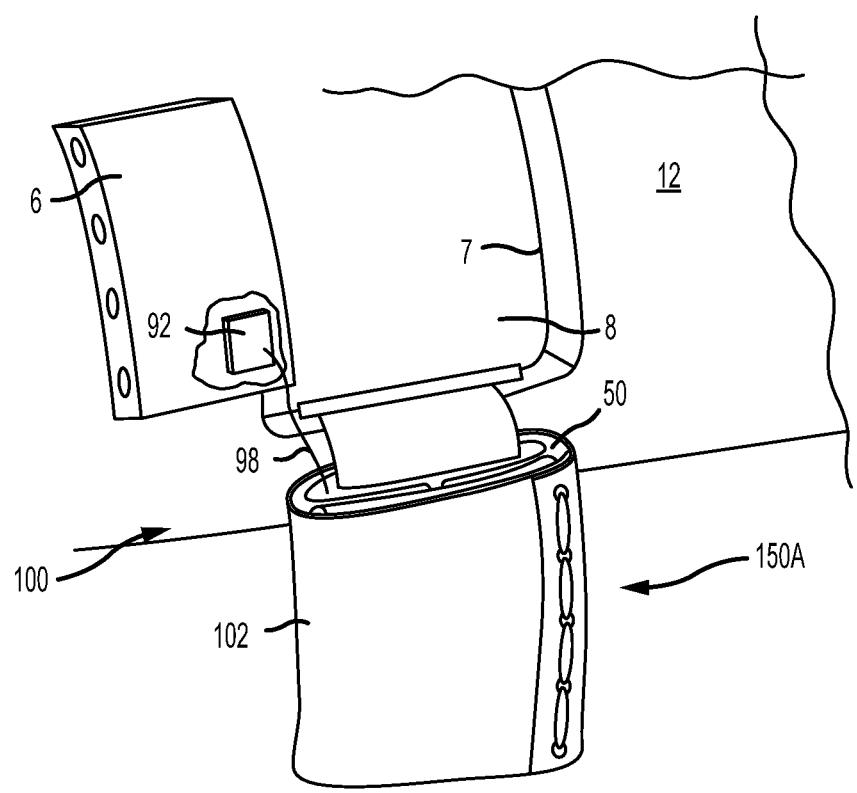
FIGS. 2A and 2B illustrate a perspective view of an evacuation system in a packed configuration, in accordance with various embodiments.
Figure 2B:
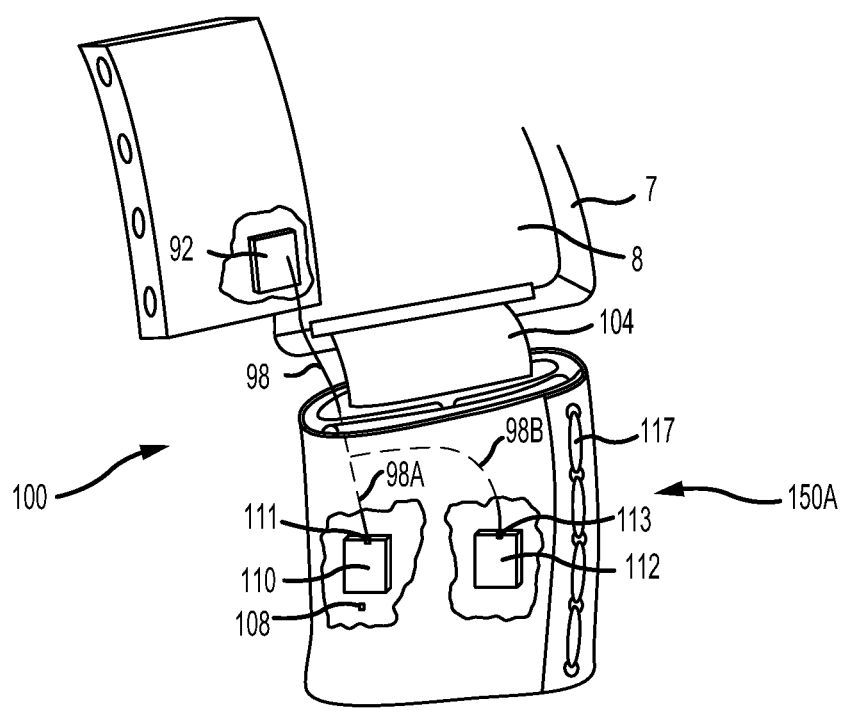

In various embodiments, with reference to FIGS. 2A and 2B, an evacuation system 100 (an example of evacuation system 20 in FIG. 1B) may comprise an evacuation slide 50, which may be inflatable. Evacuation slide 50 may be stored in a packed configuration 150A, and coupled to an inner or outer surface of door 6. In various embodiments, evacuation slide 50 may be stored in packed configuration 150A and coupled to fuselage 10 (e.g., in an evacuation system compartment). As depicted in FIGS. 2A and 2B, evacuation slide 50 may be in a pack-dropped position, in which evacuation slide 50 in packed configuration 150A has been released from door 6 and dropped. Packed configuration 150A may comprise valise 102 wrapping evacuation slide 50. Valise 102 may be held together by straps 117 in response to evacuation slide 50 being in packed configuration 150A. Doorway 8 of an aircraft may be defined by a door frame 7, in which emergency exit door 6 may be disposed before being opened. In various embodiments, evacuation system 100 may be coupled to fuselage 12 near doorway 8, and/or to door frame 7. In various embodiments, evacuation slide 50 may be coupled to fuselage 12 and/or door frame 7 by a girt 104.

With continued reference to FIGS. 2A and 2B, in various embodiments, evacuation system 100 may comprise an evacuation slide 50 and reactant packets (an example of reactant packet 60 in FIG. 1B), for example reactant packets 110, 112 coupled to evacuation slide 50. Evacuation system 100 may further comprise a trigger system 92 (an example of trigger system 65 in FIG. 1B) coupled to reactant packets 110, 112. Trigger system 92 may be coupled to emergency exit door 6, fuselage 12, and/or any other suitable part of an aircraft. In various embodiments, trigger system 92 may be coupled to evacuation slide 50. In various embodiments, reactant packets 110, 112 may be electronically coupled to trigger system 92 via a wireless connection. In various embodiments, reactant packets 110, 112 may be electronically coupled to trigger system 92 via a cable assembly 98. First stage cable end 98A of cable assembly 98 may be coupled to reactant packet 110, and first stage cable end 98B of cable assembly 98 may be coupled to reactant packet 112.

In various embodiments, reactant packets 110, 112 may comprise a chemically reactive material (e.g., in an enclosing package) configured to react in response to being activated (e.g., ignited) and produce gas as a product of the reaction to inflate evacuation slide 50. The reaction of the chemically reactive material may be an energetic gas-generating reaction. The chemically reactive material may be a solid material and/or initially gasless (i.e., there is no pressurized gas that will be used as the primary gas source to inflate evacuation slide 50). Additionally, in various embodiments, inflation of evacuation slide 50 may not require entrainment of ambient air. The chemically reactive material may be any suitable material, such as a material that includes sodium azide. For example, reactant packets 110, 112 may comprise sodium azide, potassium nitrate, and silicon dioxide. In response to being ignited, the sodium azide may form nitrogen gas, which inflates evacuation slide 50, and elemental sodium. The elemental sodium may react in a secondary reaction with the potassium nitrate to form potassium oxide, sodium oxide, and additional nitrogen gas. Finally, a tertiary reaction may take place in which potassium oxide, sodium oxide and silicon dioxide react to form silicate glass (potassium silicate and sodium silicate). This reaction is simply an exemplary reaction of a chemically reactive material to create (nitrogen) gas to inflate evacuation slide 50, as the chemically reactive material may be any suitable material.

Evacuation system 100 may have multiple stages of reactant packets, wherein each reactant packet comprises a chemically reactive materials, as described herein. Reactant packets 110, 112 may be the first stage of reactant packets in evacuation system 100. Referring to FIGS. 2A-5, reactant packets 110, 112 may be activated first, followed by secondary stage reactant packets 120, 122, and subsequently, tertiary stage reactant packets 130, 132. In various embodiments, the reactant packet stages may be activated in any suitable order. The activation of the reactant packets and/or reactant packet stages may be staggered in any suitable manner such as based on time intervals, pressure within evacuation slide 50, and/or temperature in or proximate to evacuation slide 50. The reactant packets in a reactant packet stage may be activated simultaneously or sequentially. In various embodiments, secondary stage reactant packets 120, 122 may be electronically coupled to trigger system 92 via a wireless connection. In various embodiments, secondary stage reactant packets 120, 122 may be electronically coupled to trigger system 92 via cable assembly 98 by secondary stage cable ends 98C, 98D, respectively. Likewise, in various embodiments, tertiary stage reactant packets 130, 132 may be electronically coupled to trigger system 92 via a wireless connection. In various embodiments, tertiary stage reactant packets 130, 132 may be coupled to trigger system 92 via cable assembly 98 by tertiary stage cable ends 98E, 98F, respectively. In various embodiments, the different stages of reactant packets may comprise any suitable number of reactant packets (e.g., one or more).

With reference to FIG. 2B, reactant packets 110, 112 may comprise ignitors 111, 113, respectively. Ignitors 111, 113 may be devices that are configured to ignite in response to being actuated in order to activate the reaction of the chemically reactive material in reactant packets 110, 112. Cable assembly 98 may be coupled to ignitors 111, 113 (e.g., first stage cable ends 98A and 98B may be coupled to ignitors 111, 113, respectively). In response to actuation from trigger system 92 via cable assembly 98, ignitors 111, 113 may be ignited, causing the reaction of the chemically reactive material in reactant packets 110, 112 to occur, generating the gas to inflate evacuation slide 50. In various embodiments, every reactant packet in evacuation system 100 may comprise an ignitor.

In various embodiments, ignitors 111, 113 may be electrical ignitors. In such embodiments, trigger system 92 may apply a current via cable assembly 98 to ignitors 111, 113, which in response, actuates ignitors 111, 113, and initiates the reaction of the chemically reactive material in reactant packets 110, 112. In various embodiments, ignitors 111, 113 may be mechanical ignitors. In such embodiments, trigger system 92 may cause cable assembly 98 to apply a mechanical force upon ignitors 111, 113 (e.g., by application of a firing pin), which may comprise a primer, to actuate ignitors 111, 113. The description of ignitors 111, 113 may apply to any and/or every ignitor in any other reactant packets (e.g., secondary stage reactant packets 120, 122 and/or tertiary stage reactant packets 130, 132).

Figure 4:
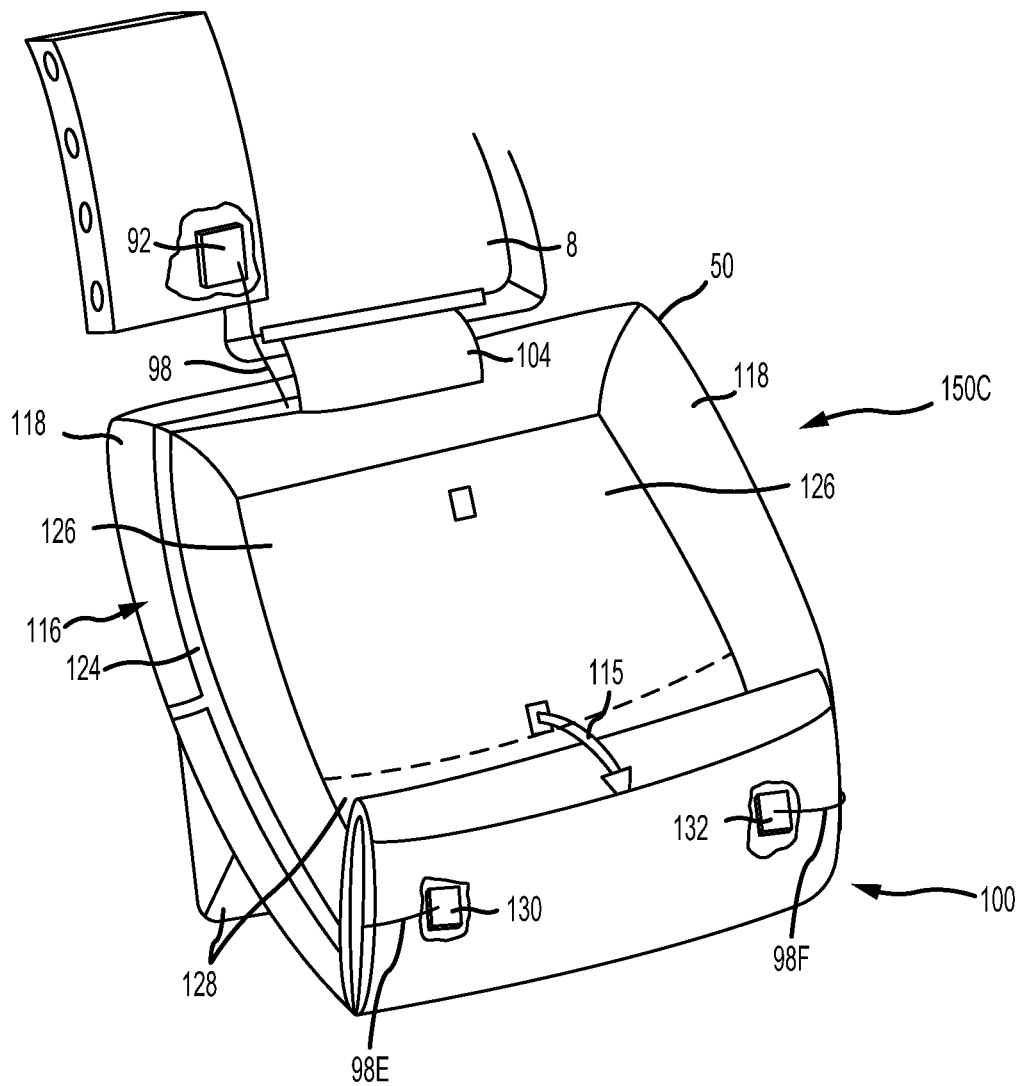
FIG. 4 illustrates a perspective view of an evacuation system in a second unfolding configuration, in accordance with various embodiments.
Figure 5:
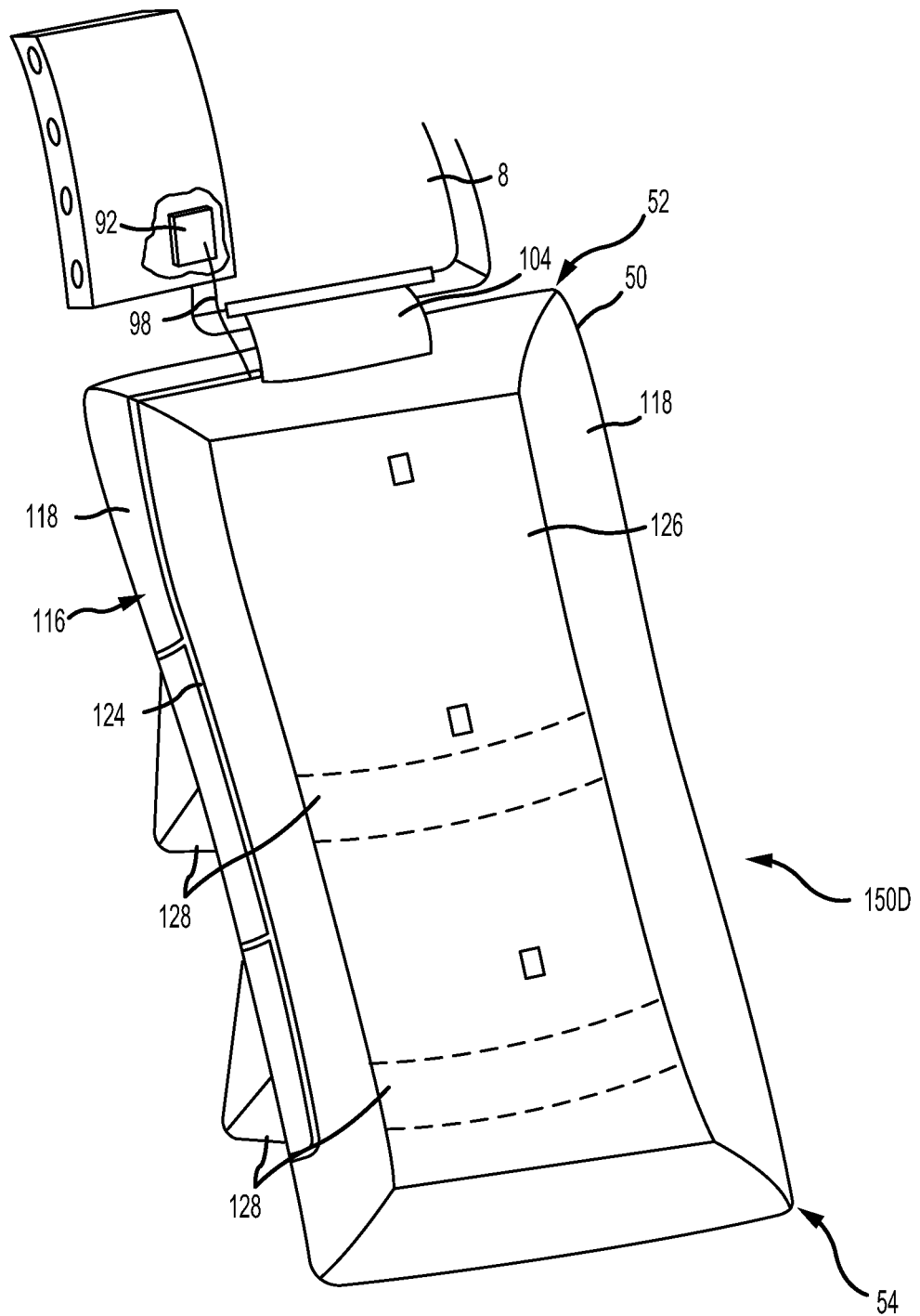
FIG. 5 illustrates a perspective view of an evacuation system in a fully unfolded configuration, in accordance with various embodiments.

In various embodiments, with reference to FIGS. 4 and 5, evacuation slide 50 may comprise an inflatable portion 116, in which gas may be disposed to inflate evacuation slide 50. In various embodiments, evacuation slide 50 may comprise at least two longitudinal tubes 118 spanning between a fuselage end 52 and a surface end 54 of evacuation slide 50. Inflatable portion 116 may further comprise a cross tube 128 spanning between longitudinal tubes 118. Multiple cross tubes 128 may span between longitudinal tubes 118 between fuselage end 52 and surface end 54 of evacuation slide 50. Longitudinal tubes 118 and cross tubes 128 may be in fluid communication with one another. In various embodiments, the reactant packets (e.g., reactant packets 110, 112, or any others) may be coupled to and/or disposed in evacuation slide 50 within the inflatable portion 116 such that the gas produced from the reaction of the chemically reactive material in the reactant packets is used to inflate evacuation slide 50. This tends to reduce travel time of the gas produced to be used for inflation. In various embodiments, the reactant packets may be coupled to evacuation slide 50 in the inflatable portion 116 at an intersection of a longitudinal tube 118 and a cross tube 128.

In various embodiments, evacuation slide 50 may comprise any suitable material to allow retention of the gas generated by the reaction of the chemically reactive material in the reactant packets. For example, evacuation slide 50 may comprise a nylon fabric with a polyurethane coating on the interior and an aluminized coating on the exterior. The aluminized coating on the exterior may allow evacuation slide 50 to resist damage from radiant heat (e.g., from a nearby fire). The interior or exterior of evacuation slide 50 may also comprise a thermal insulator or insulating layer to protect a person who is sliding down evacuation slide 50 from heat generated by the reaction of the chemically reactive material of the reactant packets and/or better stability the temperature of the internal gases. The insulator may be any suitable material such as a polymeric material, a silicone-based material, ceramic, and/or fiberglass.

In various embodiments, evacuation slide 50 may comprise a slide surface 126 disposed over cross tubes 128 and/or longitudinal tubes 118, on which a person may slide down in response to evacuation slide 50 being inflated. Slide surface 126 may comprise an insulating material to protect a person sliding down evacuation slide 50, such as a polymeric material or a silicone-based material.

In various embodiments, reactant packets 110, 112 may be coupled to evacuation slide 50 in a position more proximate to fuselage end 52 of evacuation slide 50 than secondary stage reactant packets 120, 122. Likewise, secondary stage reactant packets 120, 122 may be coupled to evacuation slide 50 in a position more proximate to fuselage end 52 of evacuation slide 50 than tertiary stage reactant packets 130, 132.

In various embodiments, evacuation slide 50 may comprise a cable tunnel 124 through which cable assembly 98 may be disposed and/or coupled to evacuation slide 50. Cable tunnel 124 may allow cable assembly 98 to reach each stage of the reactant packets. Cable tunnel 124 may be disposed in and/or coupled to evacuation slide 50 in any suitable location, such as within or on inflatable portion 116 (e.g., in a longitudinal tube 118 and/or a cross tube 128).

In various embodiments, evacuation system 100 may further comprise a sensor 108 (an example of sensor 72 in FIG. 1B). Sensor 108 may be coupled to evacuation slide 50 in any suitable location, such as within or on inflatable portion 116. In various embodiments, sensor 108 may be coupled to the aircraft in any suitable location, and not coupled to evacuation slide 50 (e.g., sensor 108 may be disposed proximate to evacuation slide 50). Additionally, there may be any number of sensors 108 disposed in or along evacuation slide 50, such as one sensor 108 proximate every reactant packet. Sensor 108 may be any suitable sensor to measure a parameter of the environment in which evacuation system 100 is operating and/or parameters during operation of evacuation system 100. For example, sensor 108 may be a level switch or accelerometer, which may detect, for instance, that evacuation slide 50 has been released from door 6 and/or fuselage 12 (in FIG. 1) and dropped into the pack-dropped position, as depicted in FIGS. 2A and 2B. As another example, sensor 108 may be a temperature or pressure sensor. Sensor 108 may take measurements of pressure and/or temperature in order to determine whether auxiliary reactant packets coupled to evacuation slide 50 should be activated to generate more gas (e.g., in a cold environment in which gas will not expand as much as a warmer environment, and thus less pressure would result than in a warmer environment). Auxiliary reactant packets may be reactant packets comprising chemically reactive in addition to the reactant packets in each reactant packet stage (e.g., reactant packets 110, 112, secondary stage reactant packets 120, 122, and/or tertiary stage reactant packets 130, 132). In various embodiments, each stage of reactant packets may comprise a reactant packet and an auxiliary reactant packet. For example, reactant packet 110 may be the first stage reactant packet and reactant packet 112 may be an auxiliary reactant packet in case it is needed during inflation of evacuation slide 50 as determined by sensor 108 readings.

As yet another example, sensor 108 may be a position sensor configured to determine the orientation of the aircraft, evacuation system 100, and/or evacuation slide 50 prior to and/or during inflation of evacuation slide 50. For example, parameter measurements from sensor 108 may indicate that the aircraft is positioned relative to the landing surface (e.g., land or water), such that less than all of the reactant packets comprised in evacuation slide 50 should be activated. For example, only first stage reactant packets 110, 112 and secondary stage reactant packets 120, 122 may be activated, and not tertiary stage reactant packets 130, 132, in response to sensor 108 determining that the aircraft is lower to the ground that an orientation requiring primary, secondary, and tertiary reactant packets to be activated to inflate evacuation slide 50. Tertiary stage reactant packets 130, 132 may not be needed to inflate evacuation slide 50 in order for it to reach the landing surface, and may be prevented from activating.

In addition, sensor 108 may allow determination of the rate of activation between the stages of reactant packets. For example, if the pressure caused by reactant packets 110, 112 (e.g., first stage reactant packets) is high because of a high surrounding or internal temperature, readings by sensor 108 of pressure and/or temperature (internal and/or external to evacuation slide 50) may allow a determination that activation of secondary stage reactant packets 120, 122 should be delayed more than normal during the activation sequence of the reactant packet stages (or prevented from activating at all together). In various embodiments, readings by sensor 108 may allow a determination that one or more reactant packets should not be activated if, for example, such reactant packets are not needed to achieve evacuation slide 50 inflation.

In various embodiments, evacuation system 100 may comprise a processor (an example of processor 70 in FIG. 1B) in electronic communication with trigger system 92, sensor 108, and/or the reactant packets (e.g., reactant packets 110, 112). In various embodiments, the processor may be comprised in trigger system 92, or any other suitable location in or outside the aircraft. The processor may be configured to operate as a data acquisition and digital signal processing system. For example, the processor may receive and process data acquired by sensor 108 and/or transmit commands to trigger system 92. In various embodiments, the processor may be configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 6:
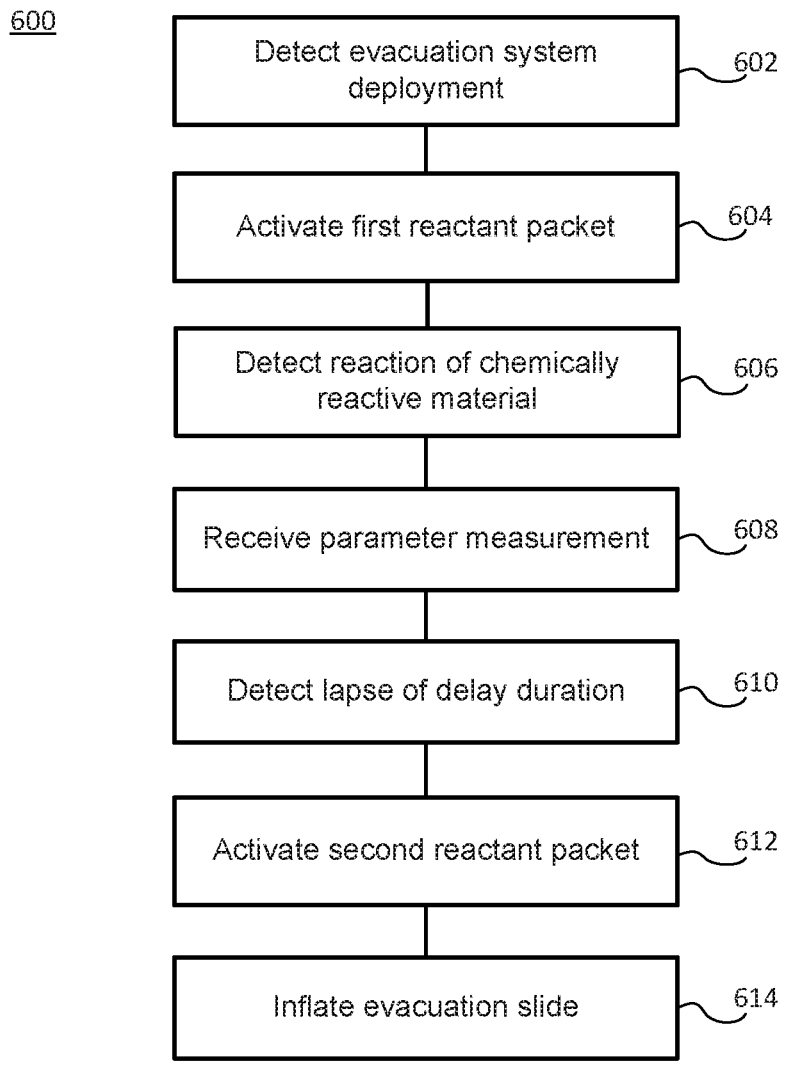
FIG. 6 illustrates a method for inflating an evacuation slide, in accordance with various embodiments.

FIG. 6 depicts a method 600 for inflating an evacuation slide, in accordance with various embodiments. With combined reference to FIGS. 2A-5 and FIG. 6, the process of inflating evacuation slide 50 of evacuation system 100 is explained. In various embodiments, in response to emergency exit door 6 being opened, evacuation system 100 may be deployed (i.e., one or more components of evacuation system 100 may be activated), which may comprise evacuation slide 50 being dropped outside of fuselage 12. Evacuation slide 50 may be in packed configuration 150A. The processor comprised in evacuation system 100 may detect that evacuation system 100 has been deployed (step 602), and/or that emergency exit door 6 has been opened, via a sensor 108 comprising a level switch and/or accelerometer, for example. In response, the processor may command activation of a first reactant packet (step 604), which may be a reactant packet from first stage reactant packets 110, 112, or any other reactant packet stage. In various embodiments, evacuation system 100 may comprise any suitable number to reactant pack stages. Activation of the first reactant packet may comprise the processor commanding trigger system 92 to apply a current to a reactant packet in evacuation system 100. Trigger system 92 may be electronically coupled to a reactant packet, such as reactant packets 110, 112. In response to receiving the command from the processor, trigger system 92 may apply a current to the first reactant packet (e.g., via cable assembly 98 or via a wireless connection and a battery comprised in the first reactant packet.

The current applied to the first reactant may actuate (i.e., ignite) an ignitor comprised in the first reactant packet, such as ignitors 111, 113 of reactant packets 110, 112, respectively. In various embodiments, the ignitor may be mechanically activated. In response to actuation of the ignitor, the chemically reactive material in the first reactant packet may react. In various embodiments, the current applied to the first reactant packet by trigger system 92 may directly activate the chemically reactive material in the first reactant packet. The reaction of the chemically reactive material in the first reactant packet may create gas, inflating at least a portion of inflatable portion 116 of evacuation slide 50.

Figure 3:
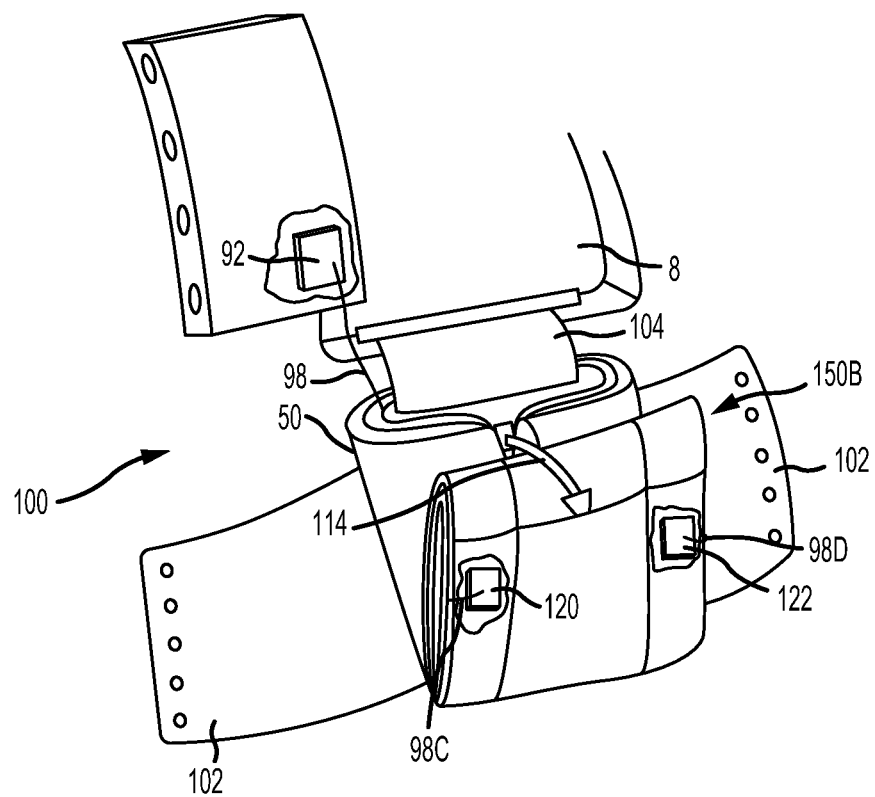
FIG. 3 illustrates a perspective view of an evacuation system in a first unfolding configuration, in accordance with various embodiments.

In response to the gas being produced, valise 102 may be forced open by pressure created by the gas from the first reactant packet (e.g., first stage reactant packets 110, 112), as depicted in FIG. 3. Evacuation slide 50 may be in a first unfolding configuration 150B as a result. In response to the first reactant packet producing gas, the processor may detect the reaction of the chemically reactive material of the first reactant packet (step 606). The processor may detect the reaction by detecting a change in temperature and/or pressure from parameter measurements taken by sensor 108. Therefore, the processor may receive a parameter measurement (step 608) from sensor 108, detecting temperature, pressure, or any other parameter within and/or around evacuation slide 50.

In various embodiments, the processor may command the activation of a second reactant packet (step 612), which may be, for example, a reactant packet from second stage reactant packets 120, 122 or any other reactant packet stage, or an auxiliary reactant packet. Activation of the second reactant packet may comprise the processor commanding trigger system 92 to apply current to the second reactant packet. The activation of the second reactant packet may be in response to receiving the parameter measurements from sensor 108. In various embodiments, the processor may command trigger system 92 to apply current to the second reactant packet in response to the measured parameter being detected by sensor 108 reaching or exceeding a parameter threshold. For example, once a certain temperature and/or pressure within or around evacuation slide 50 is reached (i.e., a temperature threshold or pressure threshold, respectively, or generically, a parameter threshold), the processor may detect such a parameter threshold from information received from sensor 108, and in response, command trigger system 92 to activate the second reactant packet. In various embodiments, the processor may command trigger system 92 to apply current to the second reactant packet in response to the measured parameter being detected by sensor 108 being below a parameter threshold. For example, if the pressure threshold is not reached after activation of the first reactant packet, the processor may command the activation of the second reactant packet to increase the pressure and/or temperature within evacuation slide 50.

Sensor 108 may allow the processor to provide the command which will result in the activation of subsequent reactant packets (e.g., secondary stage reactant packets 120, 122 after reactant packets 110, 112) at an optimal time depending on the conditions inside and outside of evacuation slide 50. For example, if the surrounding environment is very hot (e.g., in a desert), the pressure and/or temperature generated by or resulting from reactant packets 110, 112 as a first stage of reactant packets may be much greater than in a cold environment (e.g., in snow). Therefore, parameter measurements from sensor 108 may allow delay by the processor in activating subsequent reactant packets in a warmer environment, or faster activation of subsequent reactant packets in a colder environment. In various embodiments, the processor may receive the parameter measurement, and in response, may prevent subsequent reactant packets, such as the second reactant packet, from activating. Preventing subsequent reactant packets from reacting may occur because processor has determined, based on parameter measurements from sensor 108, that adequate pressure and/or temperature has been reached in or around evacuation slide 50. Preventing subsequent reactant packets from reacting may also occur because processor has determined that evacuation slide 50 is sufficiently inflated to reach a landing surface, based on a parameter measurement comprising position information of the aircraft, evacuation system 100, and/or evacuation slide 50.

In various embodiments, sensor 108 may allow the processor to activate auxiliary reactant packets if needed to increase pressure (e.g., in a cold environment in which one or more stages of reactant packets may not produce enough gas to reach a pressure threshold, or fully inflate evacuation slide 50). Activation of auxiliary reactant packets may take place at any stage of reactant packets. For example, the processor may command trigger system 92 to apply current to reactant packet 110, wherein reactant packet 112 is an auxiliary reactant packet that is not activated simultaneously with reactant packet 110. In response, reactant packet 110 may create enough gas to reach the necessary parameter (e.g., pressure) threshold, and therefore processor may not activate, or prevent activation of, an auxiliary reactant packet. In various embodiments, reactant packet 110 may not create enough gas to reach the necessary parameter (e.g., pressure) threshold, so in response, the processor may command trigger system 92 to apply current to reactant packet 112 via cable assembly 98 to provide additional gas to reach the pressure threshold. Overall, reactant packets in evacuation system 100 may be activated in any suitable order and/or at any suitable time as determined by the processor.

In various embodiments, evacuation system 100 may comprise a timer (or sensor 108 may comprise a timer), allowing stages of reactant packets in evacuation slide 50 to be activated in time intervals. Therefore, the processor may detect the lapse of a delay duration (step 610) after reaction of the first reactant packet. In response, the processor may command that additional reactant packets (e.g., the second reactant packet) be activated. Again, the reactant packets comprised in evacuation slide 50 may be activated in any suitable order. The delay duration may be a predetermined time period to provide time spacing between activation of the reactant packets and/or reactant packet stages in evacuation slide 50. In various embodiments, evacuation system 100 may have a timer and a sensor 108, such that there are set time intervals between the activation of reactant packet stages. Under normal (i.e., temperate) conditions in the surrounding environment, i.e., conditions which will not cause a decrease or increase in pressure from the gas generated by the reactant packets causing the need for an altered timing of reactant packet activation, reactant packets may be activated as dictated by the time intervals. However, if the surrounding conditions cause an increase or decrease in gas pressure generated by the reactant packets (as discussed herein) from the gas pressure generated in normal or temperate conditions, sensor 108 may detect such a pressure difference, and the processor may alter the timing of the reactant packet activation to account the pressure difference.

As discussed herein, the first reactant packet may be a first stage reactant packet 110 or 112. Therefore, in order to fully inflate evacuation slide 50, additional reactant packets may need to be activated to produce gas (e.g., the second reactant packet). Accordingly, the processor may command activation of the second reactant packet (step 612) after commanding activation of the first reactant packet. The gas generated by the activation of the first and/or second reactant packet and the reaction of the chemically reactive material therein may inflate evacuation slide 50 (step 614).

In various embodiments, with reference to the reactant packet stages depicted in FIGS. 2-5, the processor may command trigger system 92 to apply current to secondary stage reactant packets 120, 122 after activation of reactant packets 110, 112, in response to the processor receiving a parameter measurement from sensor 108, the parameter measurement being above a parameter threshold, and/or after lapse of a delay duration. Trigger system 92 may apply a current to secondary stage reactant packets 120, 122 in response to being commanded to do so from the processor. The chemically reactive material in secondary stage reactant packets 120, 122 may react and create additional gas. The pressure from the resulting gas may further inflate evacuation slide 50, which may further unfold evacuation slide 50. The resulting pressure may cause first restraint 114 to break allowing further unfolding.

In various embodiments, the processor may command trigger system 92 to activate (e.g., by applying current to) additional reactant packets and/or stages of reactant packets to fully inflate evacuation slide 50. For example, evacuation slide 50 may be in second unfolding configuration 150C after activation of secondary stage reactant packets 120, 122. The processor may command trigger system 92 to, and trigger system 92 may, apply current to tertiary stage reactant packets 130, 132, activating the chemically reactive material in tertiary stage reactant packets 130, 132. The resulting production of gas may break second restraint 115, and fully inflate evacuation slide 50 into a fully inflated configuration 150D.

In various embodiments, the heat created by the rapid generation of gas by the reactant packets over a short time (e.g., less than 5 seconds) may be enough to burn the skin of someone coming into contact with evacuation slide 50. Therefore, evacuation system 100 may further comprise a tank of compressed gas (e.g., carbon dioxide) to be released into evacuation slide 50 during gas generation by the reactant packets. The compressed air may serve to cool the gas generated by the reactant packets in order to prevent or mitigate possible burns to a person coming into contact with evacuation slide 50.

Evacuation system 100 not only has the benefit of providing gas from the reactant packets directly into inflatable portion 116 of evacuation slide 50, thus minimizing travel time of the gas produced to be used for inflation, but there are no large, heavy air tanks taking up valuable space on the aircraft. Therefore, evacuation system 100 provides a rapid and spatially efficient way to inflate an evacuation slide 50 in an emergency situation.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. An evacuation system, comprising:
an evacuation slide comprising an inflatable portion;

a reactant packet disposed within the inflatable portion including a chemically reactive material configured to react to produce a gas and inflate the evacuation slide; and a trigger system and a cable assembly, wherein the cable assembly is coupled to the trigger system and the reactant packet, wherein the cable assembly is coupled to the evacuation slide within a cable tunnel disposed in the inflatable portion of the evacuation slide.

2. The evacuation system of claim 1, wherein the inflatable portion comprises at least two longitudinal tubes spanning between a fuselage end and a surface end of the evacuation slide, and a cross tube, wherein the at least two longitudinal tubes are in fluid communication with the cross tube.

3. The evacuation system of claim 1, wherein the reactant packet is a first reactant packet, and the evacuation system further comprises a second reactant packet disposed within the inflatable portion, wherein the second reactant packet comprises a second chemically reactive material configured to react and produce a second gas.

4. The evacuation system of claim 3, further comprising a timer, wherein a second of the first reactant packet and the second reactant packet is configured to activate in response to a delay duration lapsing after a first of the first reactant packet and the second reactant packet activates.

5. The evacuation system of claim 3, further comprising a sensor at least one of coupled to or disposed proximate to the evacuation slide configured to take a parameter measurement of a parameter surrounding the evacuation slide, wherein the evacuation system is configured to initiate activation of at least one of the first reactant packet or the second reactant packet based on the parameter measurement.

6. The evacuation system of claim 5, wherein the sensor is a position sensor configured to detect an orientation of the evacuation system, wherein the evacuation system is configured to activate at least one of the first reactant packet or the second reactant packet based on the orientation.

7. The evacuation system of claim 5, wherein the sensor is a pressure sensor configured to measure a pressure of the evacuation slide, wherein the evacuation system is configured to activate a first of the first reactant packet and the second reactant packet, and subsequently activate a second of the first reactant packet and the second reactant packet based on the pressure.

8. The evacuation system of claim 5, wherein the sensor is a temperature sensor configured to measure a temperature at least one of in or proximate to the evacuation slide, wherein the evacuation system is configured to stagger activation of a first of the first reactant packet and the second reactant packet and a second of the first reactant packet and the second reactant packet based on the temperature.

9. The evacuation system of claim 3, further comprising a processor in electronic communication with a trigger system; and a tangible, non-transitory memory configured to communicate with the processor, the tangible, non-transitory memory having instructions stored thereon that, in response to execution by the processor, cause the processor to perform operations comprising:
detecting, by the processor, a deployment of the evacuation system; and
commanding, by the processor, the trigger system to activate the first reactant packet and react the chemically reactive material to produce gas to inflate the evacuation slide.

10. The evacuation system of claim 9, further comprising a sensor coupled to the evacuation slide, wherein the sensor is in electronic communication with the processor and is configured to measure a parameter of the evacuation slide during inflation, wherein the parameter is at least one of temperature or pressure, wherein the operations further comprise:
receiving, by the processor, a parameter measurement from the sensor; and
commanding, by the processor, the trigger system to activate the second reactant packet in response to the receiving the parameter measurement.

11. The evacuation system of claim 1, wherein the chemically reactive material comprises a solid material.

12. A method of inflating an evacuation slide of an evacuation system, comprising:
activating a first reactant packet disposed in the evacuation slide, wherein the activating the first reactant packet comprises:
commanding, by a processor, a trigger system to apply a current to the first reactant packet;
applying the current to the first reactant packet via the trigger system; and
igniting an electrical ignitor comprised in the first reactant packet in response to the applying the current to the first reactant packet;
reacting a chemically reactive material in the first reactant packet in response to the igniting the electrical ignitor, producing a gas; and
inflating the evacuation slide with the gas.

13. The method of claim 12, further comprising receiving, by a processor, a parameter measurement from a sensor in response to the reacting the chemically reactive material, wherein the sensor is at least one of coupled to or disposed proximate to the evacuation slide.

14. The method of claim 13, further comprising:
activating a second reactant packet disposed in the evacuation slide in response to the receiving the parameter measurement;
reacting a second chemically reactive material in the second reactant packet in response to the activating the second reactant packet, producing a second gas; and
further inflating the evacuation slide with the second gas.

15. The method of claim 13, further comprising preventing, by the processor, activation of a second reactant packet disposed in the evacuation slide in response to the receiving the parameter measurement.

16. The method of claim 12, further comprising detecting, by the processor, that a delay duration has lapsed after the activating the first reactant packet, and activating a second reactant packet in response to the detecting that the delay duration has lapsed.

17. An aircraft comprising the evacuation system of claim 1.

18. An evacuation system, comprising:
an evacuation slide comprising an inflatable portion;
a first reactant packet disposed within the inflatable portion including a chemically reactive material configured to react to produce a gas and inflate the evacuation slide;
a second reactant packed disposed within the inflatable portion including a second chemically reactive material configured to react to produce a second gas;
a temperature sensor at least one of coupled to or disposed proximate to the evacuation slide configured to measure a temperature at least one of in or proximate to the evacuation slide, wherein the evacuation system is configured to stagger activation of a first of the first reactant packet and the second reactant packet and a second of the first reactant packet and the second reactant packet based on the temperature.

* * * * *